Sept. 7, 1943.  W. L. WOOLF  2,328,597

CONTROLLING DEVICE FOR SOUND RECORD FILM

Filed March 13, 1940  6 Sheets-Sheet 1

INVENTOR
WILLIAM L. WOOLF
BY
Geo. M. Dowe.
ATTORNEY

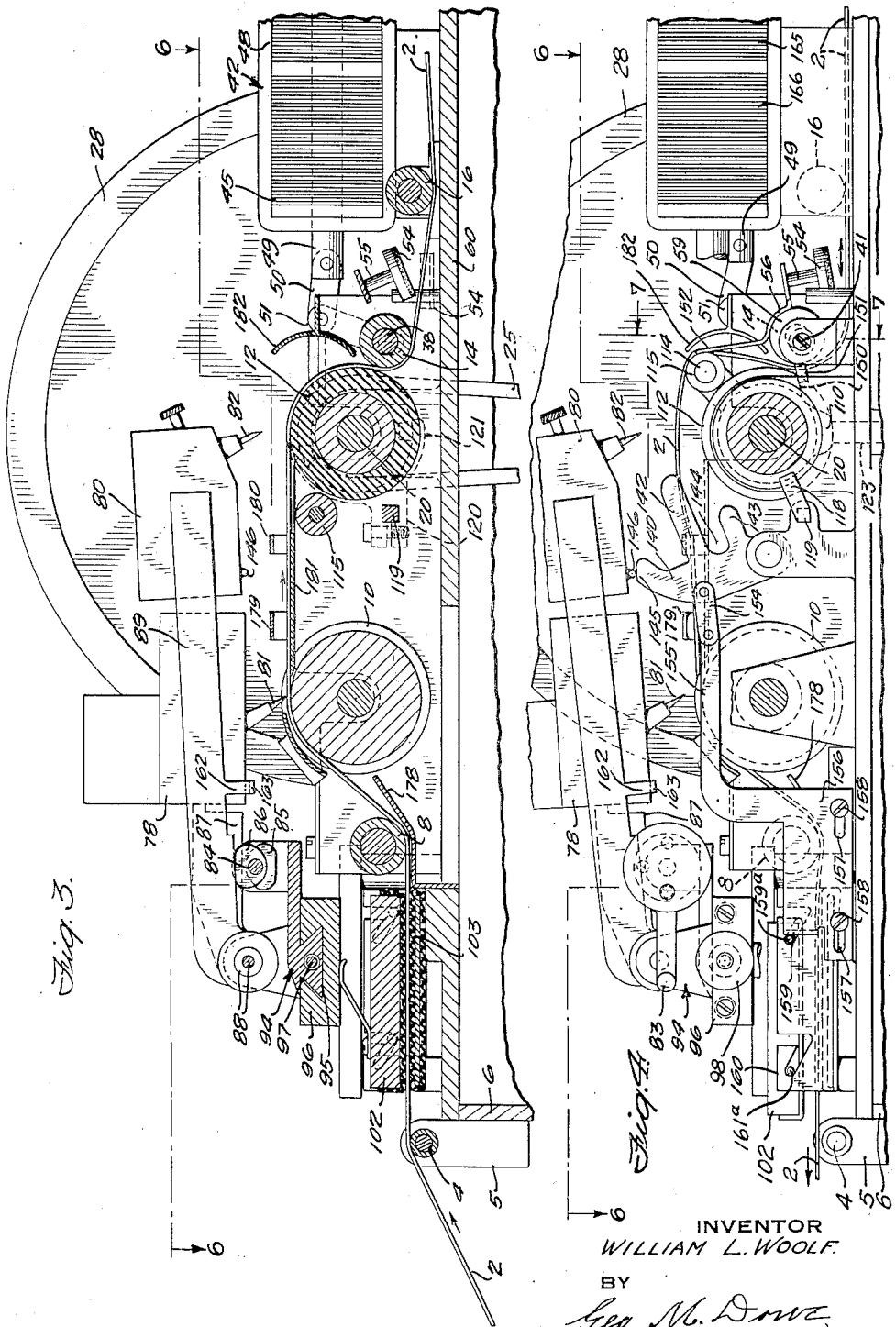

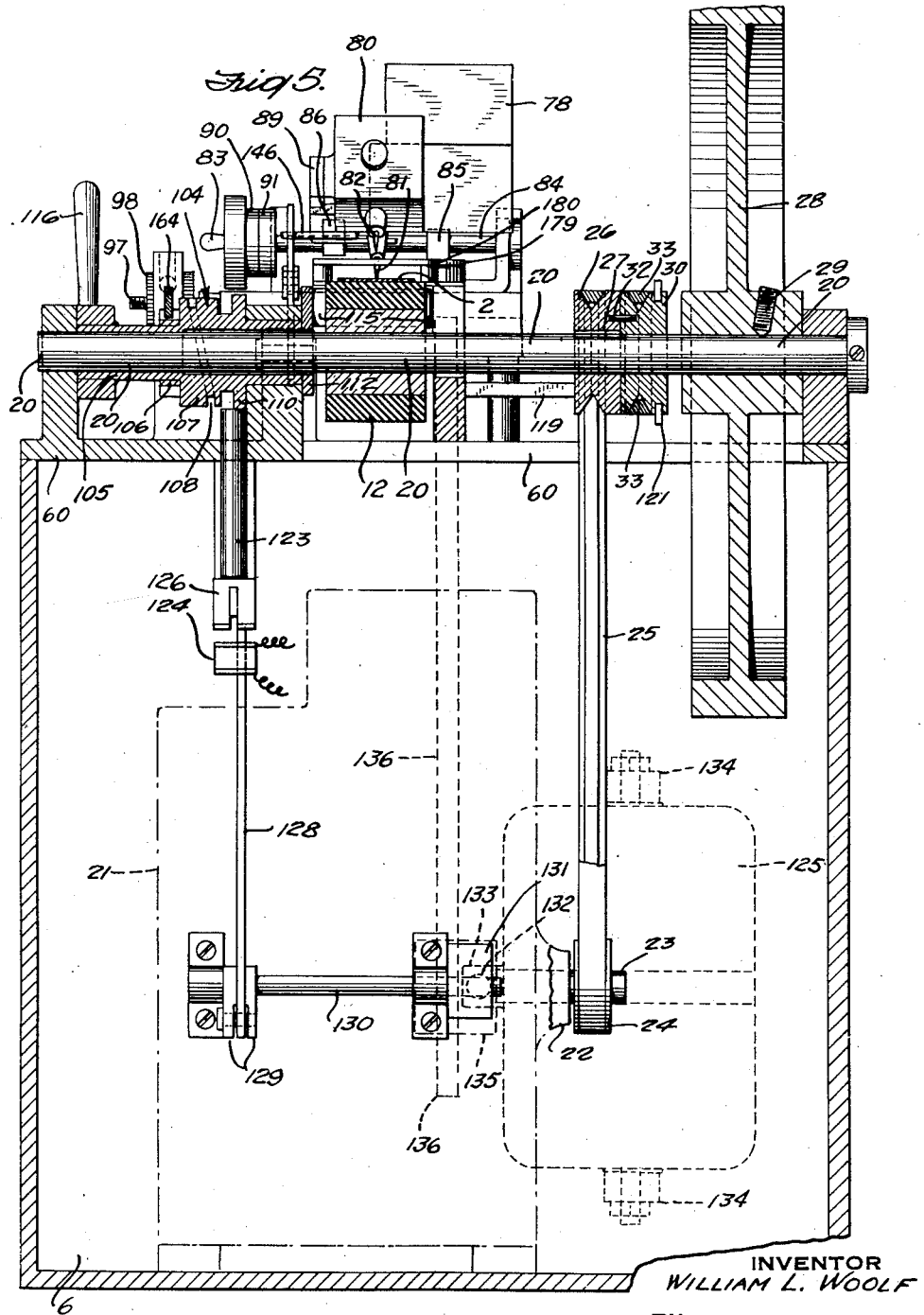

Sept. 7, 1943.  W. L. WOOLF  2,328,597
CONTROLLING DEVICE FOR SOUND RECORD FILM
Filed March 13, 1940  6 Sheets-Sheet 5
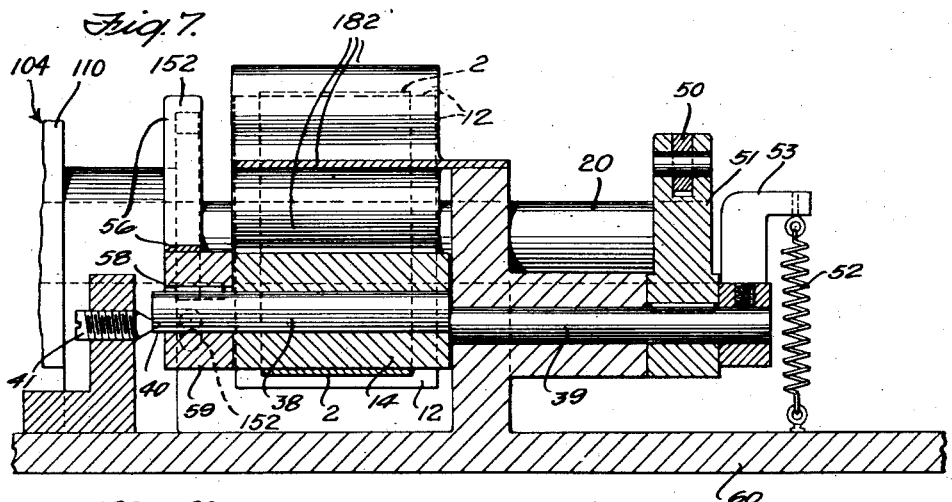
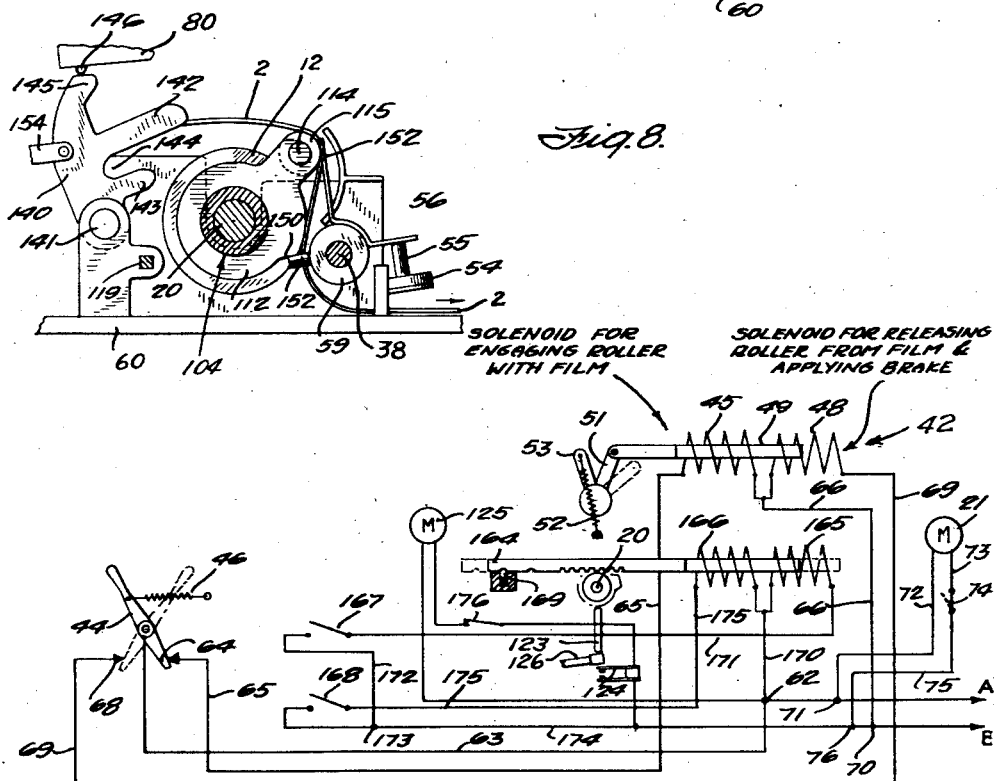
INVENTOR
WILLIAM L. WOOLF.
BY
Geo. M. Dowe.
ATTORNEY

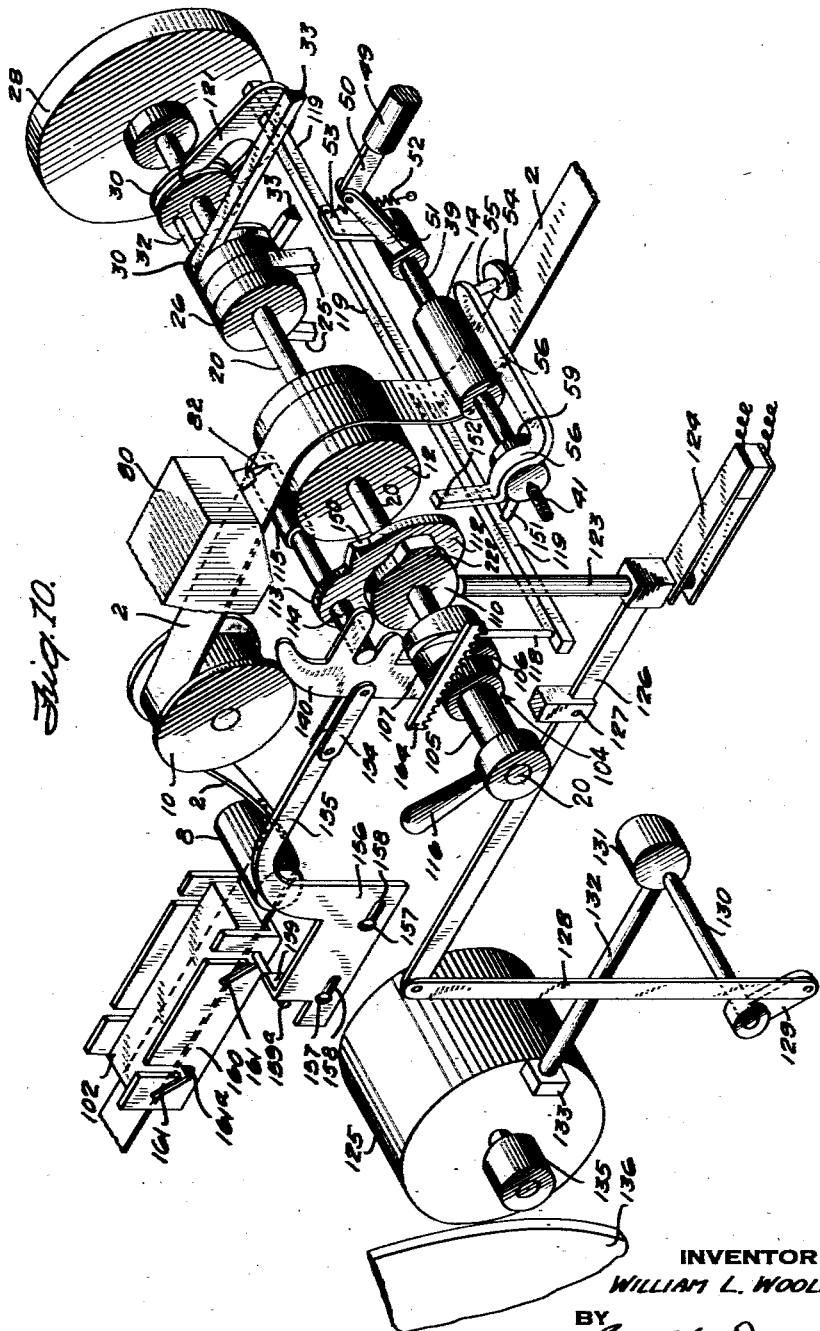

Patented Sept. 7, 1943

2,328,597

UNITED STATES PATENT OFFICE 2,328,597

CONTROLLING DEVICE FOR SOUND RECORD FILM

William L. Woolf, Bayside, Long Island, N. Y., assignor, by mesne assignments, to Recordgraph Corporation, New York, N. Y., a corporation of Delaware Application March 13, 1940, Serial No. 323,671

11 Claims. (Cl. 274—11)

The present invention relates to sound recording or reproducing mechanisms and more particularly to that type in which the record medium is in the form of a strip or film.

The film instead of being propelled by the usual sprocket is fed by means of a friction roller, and means are provided by which the film is clutched to the feed roller or freed therefrom and a brake applied to the film to arrest its progress.

A primary object of the invention is to provide a mechanism of this type which is well adapted for use as a dictating machine. To this end a further object is to provide controlling means for the film; for the recording and reproducing heads; for the supply and take-up reels and other elements; which controlling means is adapted to be moved manually or by the closing of a circuit and which performs a variety of functions. By such control the operator is relieved of the necessity of manipulating a number of devices otherwise made necessary.

The various features of the invention contributing to the accomplishment of the above and other objects will best be understood by reference to the following description and claims when taken in connection with the accompanying drawings, in which:

Figure 1 is a plan view on a somewhat reduced scale but showing substantially the entire machine;

Figure 2 is a section on the line 2—2 of Figure 1;

Figure 3 is a central longitudinal section on the line 3—3 of Figure 6;

Figure 4 is a part sectional, part elevational view of the mechanism shown in Figure 3 but showing some additional parts, some of the parts being in a different position;

Figure 5 is a section on the line 5—5 of Figure 1;

Figure 7 is a section on a larger scale than Figure 3, and on the line 7—7 of Figure 4;

Figure 8 is an elevational detail;

Figure 9 is a wiring diagram; and

Figure 10 is a perspective view of the principal parts of the machine.

Figure 6:
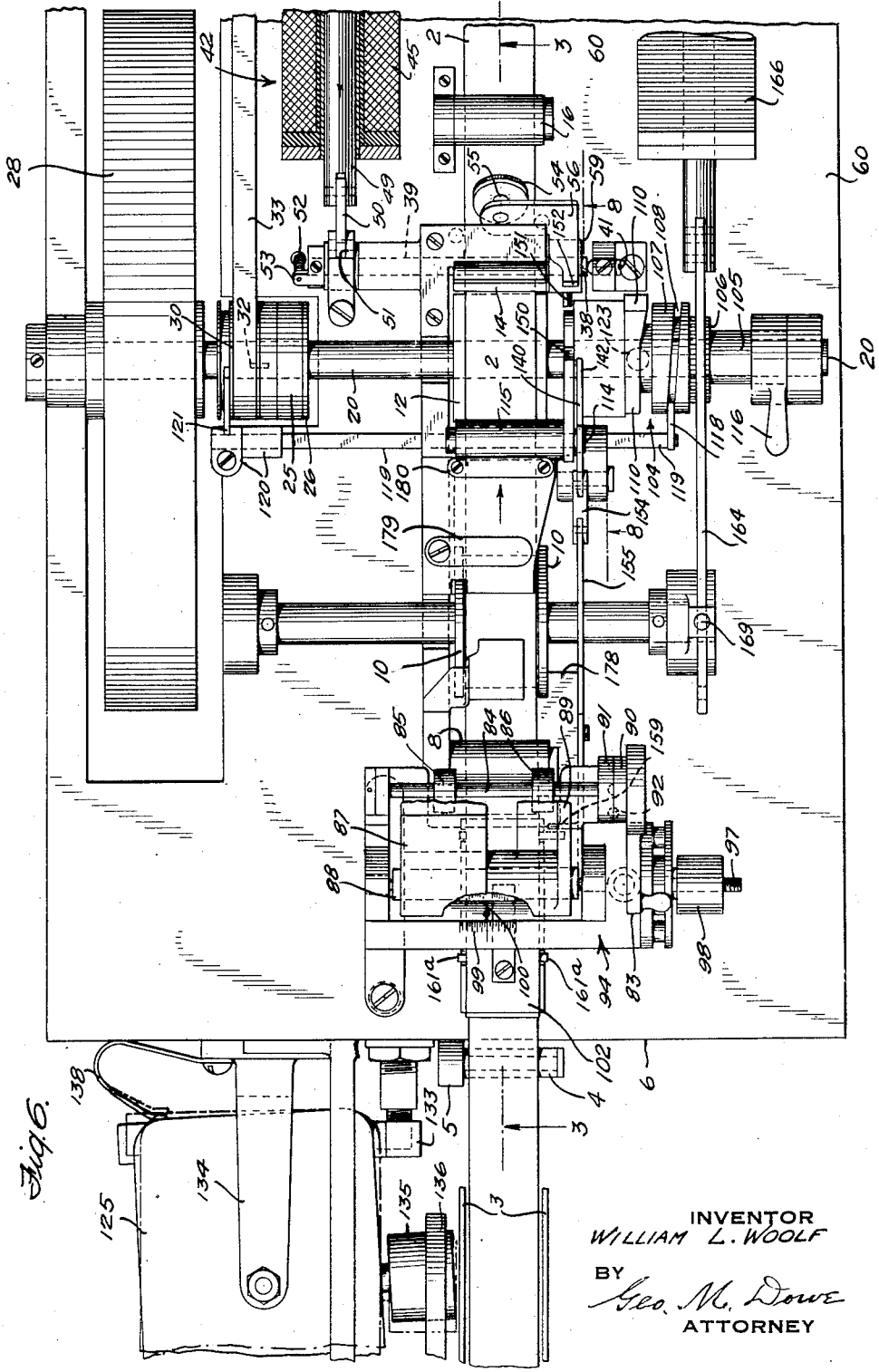
Figure 6 is an enlarged plan view with the recording and reproducing heads removed.

Referring to Figures 1 and 3, the film 2 is taken from supply reel 3 and passes over a guide roll 4 supported in a bracket 5 secured to an end frame 6. The film passes over another guide roller 8 and upwardly over a drum 10 which serves as a support for the film during recording operations. From the drum 10 the film passes over a substantial arc of a friction feed roller 12 then downwardly under a clutch roller 14, located at the forward end of the arc; thence under another guide roller 16 to the take-up reel 18. The roller 14 thus acts both as a clutch roller and as a guide roller.

The film is fed through the machine during recording or reproducing under control of the friction roller 12 and the clutch roller 14 and may be clutched to or unclutched from engagement with the friction feed roller 12 at will. The feed roller 12 is secured to a shaft 20 suitably supported in the machine frames as clearly shown in Figure 5. The shaft 20 and consequently the roller 12 are constantly driven in a clockwise direction and preferably such drive is effected by a motor shown diagrammatically in dash and dot outline at 21, Figure 5; also in Figure 2. The hub of the motor shaft is shown at 22, the shaft being indicated at 23. This shaft carries a pulley 24 driving a belt 25, engaging a pulley 26 secured to the shaft 20 by means of a key 27. As long as the switch controlling the circuit of the motor 21 is closed, the shaft 20 and its connected parts continue to rotate. In order that the speed of rotation may be kept as uniform as possible, a fly wheel 28, Figure 5, is secured to the shaft 20, by means of a screw 29.

The take-up reel 18 derives its motion from the shaft 20 through the medium of a pulley 30 loosely mounted on the shaft 20 but which is normally caused to rotate with the shaft through the medium of a pin 32 projecting from the pulley 26. This pin engages a depression or hole in the pulley 30 so that the latter is normally driven with the shaft 20. A belt 33, Figure 1, passes over the pulley 30 and over a pulley 34 secured to a shaft 35 upon which the take-up reel 18 is mounted. The belt 33 is preferably formed as a spiral spring, and is similar to the spring belt 13 of Madaler and Woolf Patent 2,173,048, September 2, 1939. The shaft 35 is supported by a bracket 36 extending from the right hand end plate of the machine and having a hub portion 37 through which the shaft 35 extends.

Since one of the objects of the present invention is to provide a machine which may conveniently be used for dictating purposes, it is desirable that the feed of the film through the machine may be stopped and started at will. This function is accomplished by the clutch roller 14 in connection with a brake member presently to be described. The roller 14 is loosely mounted on a shaft 38, Figure 7, which shaft at one end is eccentrically secured to shaft 39 and at its other end is eccentrically supported at 40 by a screw 41. The pivotal point of the screw 41 is in alignment with the axis of the shaft 39. Consequently any rocking of the shaft 39 will cause the eccentric shaft 38 also to rock about an axis which is a prolongation of the axis of the shaft 39 and will cause the roller 14 to move from the position shown in Figure 3 to a position in which it is disengaged from the feed roller 12. Movement of the clutch roller 14 to either of these two positions is under control of a two part solenoid 42, Figures 3 and 4. Different portions of the solenoid are energized under control of a lever 44, Figure 9. In practice, this lever will be attached to a microphone into which the dictator will speak and when he desires to dictate, he presses his thumb on the lever 44 and holds it in the full line position shown in Figure 9. This closes a circuit which energizes the left hand portion 45 of the solenoid 42. Upon release of the lever 44, a spring 46 moves it to the dotted line position shown in Figure 9 and causes the right hand section 48, of the solenoid 42, to be supplied with current.

When the section 45 of the solenoid is energized, its plunger 49 moves to the left and occupies the position shown in Figure 3. A link 50 connects the end of the plunger to an upstanding arm 51 keyed to the shaft 39, Figure 7, and rocks said shaft from the dotted line position shown in Figure 9 to the full line position shown therein. A spring 52 connected to an arm 53 also secured to shaft 39, Figure 7, tends to hold the parts in the position moved by the solenoid.

This movement of the arm 51 rocks the shaft 39, which rocking movement causes the clutch roller 14 to be moved to the position shown in Figure 3, in which position it engages the film and presses it against the friction feed roller 12 with sufficient force to clutch the film to the feed roller thereby enabling the film to be propelled by said feed roller.

When the operator releases the lever 44, Figure 9, thereby energizing the right hand portion 48 of the solenoid 42, the plunger 49 is moved to the dotted line position shown in Figure 9. This movement causes the clutch roller 14 to move away from the roller 12 to thereby relieve its clutching action and at the same time a brake 54, Figure 3 is applied to the film to arrest its motion.

This brake consists of a pad 54 secured to a stud 55 which stud is connected to a somewhat odd shaped member 56, see Figures 4, 8 and 10. This member 56, as shown in Figure 7, is secured by a key 58 to a hub 59 through which the eccentric shaft 38 passes. When the eccentric shaft 38 is rocked, therefore, the hub 58 partakes of this rocking movement and causes the brake pad 54 to be moved from the full line position shown in Figure 3 to the dotted line position shown therein. The pad presses the film against the top plate 60 thereby stopping its motion.

The circuit for energizing the sections of solenoid 42 will be understood from Figure 9. From terminal A, current flows to junction 62 and through wire 63 to the pivotal support for the lever 44, thence along the lever arm to contact 64, thence along wire 65 to section 45 of the solenoid 42, from which it passes by way of wire 66, to terminal B.

When the lever 44 is moved by spring 46 so that its lower end engages contact 68, current flows from terminal A to junction 62 along wires 63 to the pivotal support for the lever 44 thence to contact 68 and along wire 69 to the right hand portion 48 of solenoid 42. From said solenoid, it passes through wires 66 to junction 70, back to terminal B. The circuit for supplying the motor 21 with current passes from terminal A to junction 71, along wire 72, to the motor 21. From the motor it passes along wire 73 and through switch 74 to wire 75 to junction 76, thence to terminal B.

From the mechanism so far described, there is provided a continuously rotating friction roller for advancing the film with means for, at will, clutching the film to the roller or unclutching it from the roller.

The roller may be given the necessary coefficient of friction by having its surface composed of rubber of sufficient softness and resiliency to serve as a backing for the film when the pick-up head is in reproducing position.

A friction roller of this type has a number of advantages over a sprocket drive and the control of this motion in the manner described causes it to be stopped and started almost instantaneously. This, of course, could not be accomplished if the heavy fly wheel had to be stopped at each stoppage of the film. It is also to be noted that when the film is being engaged with the friction roller 12 by means of the clutch roller 14, there is a momentary period during which some slippage occurs between the film and drum. The film, therefore does not start with a jerk but picks up speed, first slowly, then swiftly, the entire period of acceleration, however, being very short, yet the film is not jerked or broken.

In Figure 3 the recording head is diagrammatically shown at 78 and a pick-up head at 80. In the position shown in Figure 3, the stylus 81 of the recording head is in engagement with the film while the stylus 82, of the pick-up head is in inoperative position. Means are provided under manual control whereby either stylus may be placed in operative relation to the film or both raised to inoperative position. These movements are under control of a lever 83, Figures 2, 4 and 6. The lever is secured to a shaft 84, Figure 3, which shaft carries two cams 85 and 86. The spacing of these cams on the shaft 84 is best shown in Figure 6, while their shape is best shown in Figure 3. In the position of the cams there shown, the cam 85 has its minor axis in line with an arm 87 extending rearwardly from the recording head 78 and pivoted on the shaft 88. Since the stylus 81 rests upon the film in the Figure 3 position of the parts, the cam 85 slightly clears the under surface of the arm 87. From the shape of the cam 85 it will be apparent that if it were moved from the position shown in Figure 3, through 180°, the recording head 78 would be lifted to inoperative position. At the same time the cam 86 would present its short axis in line with an arm 89 secured to the pick-up head 80 and also pivoted on the shaft 88. In other words, moving the lever 83 from the position shown in Figure 4, through 180° will result in lifting the stylus 81 of the recording head out of engagement with the film and permitting the stylus 82 of the pick-up head to engage the film. It will also be clear from Figures 3 and 6 that an intermediate position of the lever 83 or a position 90° from that shown in Figure 4 will result in lifting both the recording and pick-up heads to inoperative position.

The hub of the lever 83, as shown more clearly at 90, Figure 6, is provided with semi-circular depressions on its inner face and a stationary member 91 adjacent thereto is provided with like depressions and a friction ball is provided to engage in these depressions to hold the lever 83 in any of the three positions which it may occupy.

The shaft 88 which pivotally supports both the recording head and the pick-up head for vertical movement is supported in a carriage 94 which may be moved laterally in order that the recording head may produce parallel sound grooves in the record film and the pick-up head reproduce from such grooves. The carriage 94, Figures 3 and 6, has its lower portion engaging in a dovetail groove 95 in a plate 96. The carriage 94 carries a screw 97 engaged by a nut 98, see Figure 6, which bears against a hub projecting from the plate 96. By turning the nut 98 in one direction or the other, the carriage may be moved laterally of the film. A scale 99 is provided on the carriage as shown in Figure 6 and a pointer 100 carried by a stationary part of the machine cooperates with said scale to indicate the position of the sound heads transversely of the film.

As the film passes between guide rollers 4 and 8, Figure 3, it is pressed upon by the weight 102, the under side of which weight may be covered with some soft fabric, the purpose of the weight being to damp any vibrations which the film may have as it passes to the roller 10 and also to clean the upper surface of the film. The under surface of the film may also be cleaned by a pad 103 of soft fabric which is located beneath the film. The weight causes slight but sufficient friction between the film and the upper and lower fabric surfaces to clean it of dust or other light material adhering to it.

After the film has passed completely through the machine, and has been wound up on the take-up reel 18 it then becomes necessary to reverse the same for the purpose of recording another sound track; or when in reproducing, for the purpose of causing a different portion of the film to be presented to the pick-up stylus 82. It is to be noted, however, that a number of operations are required to be performed before actual reversing of the film may occur. During the recording operation the parts are positioned as shown in Figure 3. The weight 102 bears upon the film, the stylus 81 is in engagement with the film and the clutch roller 14 is pressing the film against the feed roller 12 and the film is being fed to the right. Similar conditions would prevail if the pick-up head 80 were in operative position since its stylus 82 would then be in contact with the film.

It is desirable that the performance of the various operations necessary to cause film reversal shall be brought about by a single manipulative member 104 and in the present embodiment of the invention, this member takes the form of a multiple cam. The member 104, Figure 5, has a hub portion 105 loosely encircling the shaft 20. Secured to the hub portion 105 is a pinion 106, Figures 5 and 6. Adjacent the pinion the member 104 is formed with a cylindrical portion 107, having a spiral groove 108 formed therein. Beyond the groove 108 the member 104 has a cam portion 110. To the right of the cam portion 110 is a disc 112 which as best shown in Figure 10, is provided with an ear 113 through which passes a stud shaft 114, the right hand portion of which shaft carries a roller 115.

Secured to the left hand end of the sleeve 105 is a lever 116 by which the member 104 may be rotated about the shaft 20. The normal position of said lever is shown in Figures 1, 6 and 10. The lever may be moved from such normal position, in a clockwise direction, through approximately 90° and when so moved it performs the following functions:

1. The take up reel is disconnected from the shaft 20 so that said reel is no longer driven.
2. The rewind reel is rendered operative by connecting a motor to such reel and closing the motor circuit.
3. The recording and pick-up heads are rendered ineffective to engage their styli with the film.
4. The film is raised entirely out of contact with the friction roller 12.
5. The brake pad 54 is raised off the film and it and the clutch roller are held in neutral position.
6. The weight 102 is lifted off the film.

The manner in which the above enumerated functions are performed and the mechanism brought into cooperation to accomplish these functions will be described in the order named.

1. *Disconnecting take-up reel from driving shaft*

The cylindrical portion 107 of the member 104 has its spiral groove 108 engaged by a finger 118 carried at the end of a rod 119, see Figures 6 and 10. This rod at its right hand end, as viewed in Figure 10 and at its left hand end as viewed in Figure 6, passes through a supporting bracket 120 and carries a yoke 121 embracing a groove in the pulley 30, see also Figure 5. Rotation of the member 107 causes the rod 119 and the yoke 121 to be shifted to the right in Figure 5 to thereby disengage the pin 32 of the pulley 26 from the hole in the pulley 30 thereby freeing said pulley from its drive through pulley 26. As soon as this disconnection is brought about the take-up reel ceases to rotate.

2. *Rendering the rewind reel operative by connecting its motor to the rewind reel and energizing the motor circuit*

The cam 110 on the member 104, Figures 5 and 10, upon being rotated from the position shown in Figure 10 to a position where its effective cam surface 122 contacts the plunger 123, depresses said plunger and closes a switch 124, see also Figure 9, whereby a circuit is closed through the reverse or rewind motor 125. This motor is normally ineffective to drive the rewind reel but is rendered effective to do so through the same plunger 123 which closes the motor circuit. For this purpose the plunger 123 depresses the right hand end of a link 126 pivoted at 127, the other end of said link being connected to a link 128 connected at its lower end to a bell crank 129 secured to a shaft 130. The shaft 130 rocks an eccentric 131, see Figure 2, and thrusts rearwardly a plunger 132 bearing against a block 133 which latter is connected to the motor 125. The motor 125 is pivoted to a yoke 134, see Figures 1 and 2 whereby it is permitted a limited rocking movement about a vertical axis. The motor shaft carries a friction roller 135 which normally is out of contact with a disc 136 mounted on the shaft 137 of the rewind reel 3, see Figure 10. In the position shown in this figure, the friction roller 135 does not contact the disc 136 as the motor is normally urged to disengaged position by the spring 138. When, however, the thrust link 132 is actuated through depression of the plunger 123, the roller 135 makes contact with the periphery of the disc 136 and drives the rewind reel in the proper direction to rewind the film.

3. *Rendering ineffective the recording and pick-up styli*

This operation is brought about through the medium of the disc 112 and through the medium of the shaft 114 carried by said disc. The left hand end of this shaft as shown in Figure 10 engages in an open slot in a member 140 pivoted at 141, Figures 2 and 8. The member 140 is somewhat in the shape of an E and is provided with arms 142 and 143 so formed as to provide a slot 144 between them, the upper portion of said member provided with a cam surface 145 for engagement with a projection 146 on the under side of the pick-up head 80, see Figure 4. Normally the member 140 is in the position shown in Figure 2 with the left hand end of the shaft 114 seated in the slot 44. When the member 104 is moved from normal position through about 90° in a clockwise direction, the disc 112 is moved from the position shown in Figures 2 and 10 to the position shown in Figures 4 and 8 and in passing out of the slot 144, the shaft 114 acting as a cam against the under edge of the arm 142 causes the member 140 to be rocked in an anti-clockwise direction so that it then assumes the position shown in Figures 4 and 8. Under these conditions the cam surface 145 engages the projection 146, lifts the pick-up from off the film if it is not already in such position, or if it has been lifted to this position by the cam 86, prevents it from re-engaging the film.

The recording head is also lifted from engagement with the film or prevented from engaging therewith, by means of the arm 89 which it will be remembered is secured to the pick-up head 80 and is pivoted at 88. This arm 89 has a downwardly projecting portion 162, Figures 3 and 4 and its lower end has a portion 163 turned at right angles to the portion 162 which portion 163 passes under the recording head 78 so that lifting of the head 80 by the member 140 also lifts the head 78 or as previously stated, prevents their engagement if they are already in lifted position under control of the cams 85 and 86.

4. *Lifting the film from contact with the feed roller 12*

The same movement of the disc 112 which rendered the styli ineffective by rocking the shaft 114 from the position shown in Figure 2 to the position shown in Figure 8 also acts to lift the film 2 entirely off of the friction roller 12. This is brought about by the roller 115 carried by the shaft 114 and which, as clearly shown in Figure 10, extends under the film. When the film is thus lifted from the roller it may be reversed in movement even though the roller 12 continues to rotate in a clockwise direction.

5. *Lifting brake pad off film and holding it and clutch roller in neutral position*

When it is desired to reverse the movement of the film the operator naturally releases pressure on the lever 44. This, as already described causes the right hand portion 48 of the solenoid 42 to be energized thereby moving the plunger 49 to the right and causing the pad 54 to assume dotted line position shown in Figure 3 with the roller 14 away from the roller 12. The disc 112 in addition to performing the functions above described, is provided with a shoulder 150 which in the position shown in Figure 8 contacts a pin 151 connected to the hub 59 of the eccentric shaft 38 and rocks said shaft to a sufficient degree to lift the pad 54 to what may be considered a neutral position, which position is shown in Figures 4 and 8. It will be remembered that the hub 59 is also connected by the key 58 to the eccentric shaft 38 so that this shaft is likewise rocked and the roller 14 thereby moved away from the friction roller 12. The neutral position of the pad 54 and the clutch roller 14 is further maintained by the roller 115 coming into contact with an extension 152 of the members 56 as clearly shown in Figures 4 and 8.

6. *Lifting the weight 102 off the film*

This is brought about through the movement of the member 140 to the position shown in Figure 4. A link 154 is pivoted to the member 140 and to an arm 155 on a slide 156. The slide 156, Figure 10, is provided with slots 157 engaging screws 158 by which it is guided for horizontal movement. As the slide is moved to the left a bent-over portion 159 engages a pin 159a projecting from the weight 102. The casing 160 is provided with oblique slots 161 with which pin 159a engages. Parallel motion of the casing under action of the slide 156 is brought about by a second pin 161a also projecting from the weight 102 and engaging the rear slot 161. Thus the rearward movement of the slide from the position shown in Figure 10 to the position shown in Figure 4 results in lifting the weight 102 off of the film.

After the film has been rewound upon the rewind reel, the cam member 104 is returned to normal position and the various parts operated thereby during its previous movement are restored to the positions they previously occupied. In the return movement of the disc 112 the shaft 114 engages the upper surface of the arm 143 to restore the member 140 to its normal position. It is also to be noted that the brake pad 54 is moved to engage the film under action of the right hand section 48 of the solenoid 42 which has remained energized during the rewinding operation.

In the foregoing description the multiple cam member 104 has been described as being moved by manipulation of the lever 116. In addition to this manual means for moving the member 104 or as a substitute therefor, electrically operated means may be provided. For this purpose the pinion 106 is utilized. This pinion has been described as being carried by the sleeve 105, but its function has not heretofore been set forth. As shown in Figures 5 and 10 this pinion 106 is engaged by a rack 164 by which the multiple cam member 104 may be moved in the same manner as it is moved by the lever 116. For the purpose of so moving it the rack 164, Figure 9, is shown diagrammatically as forming the core of a solenoid 165 and another solenoid 166. The circuit through these solenoids are controlled by two switches 167 and 168. Switch 167 controls the energization of solenoid 165 while switch 168 controls the energization of solenoid 166. When the switch 167 is closed, the rack 164 is moved from the position shown in Figure 9, to the right, thereby rotating the multiple cam member 104 in the same manner as such member is rotated by the lever 116. A spring detent 169 engages notches in the rack 164 to hold it in the two positions to which the solenoids 165 and 166 move it. Since solenoid 166 has more work to do than does solenoid 42, the form is more powerful and overcomes the action of solenoid 42.

When the switch 168 is closed, the solenoid 166 is energized and moves the rack in the opposite direction to restore the member 104 to normal position.

The switches 167 and 168 are in parallel with the switch 124. The circuit closed by the switch 167 may be traced as follows: From the terminal A, current passes to junction 62, along wire 170 to solenoid 165, through said solenoid to wire 171, thence to switch 167 and through wire 172 to junction 173 from which it passes along wire 174 to terminal B.

When switch 168 is closed, the current passes from terminal A to junction 62 through wire 170 to solenoid 166; through said solenoid to wire 175, to switch 68, through said switch to junction 173 and along wire 174 to terminal B.

*Threading the film through the machine*

When it is desired initially to thread the film through the machine, lever 116 is moved clockwise to the position for reversing the film and performs the several functions already described in connection with the rewinding operation. However, since it is not desired that the rewind motor be operated at this time, a switch 176 in the circuit leading to the reversing motor 125 is opened.

In order that the film may be readily threaded, a number of guides are provided. The film is threaded from the left, as shown in Figure 3 over the roller 4 and under the weight 102 which at this time has been lifted away from position to contact with the film. A guide 178, Figure 3, directs the film upwardly so that it passes over the roller 10. Guides 179 and 180 serve to cause the film to move in a substantially horizontal direction between said guides and a plate 181. The film then is diverted in a downward direction by a guide 182 so that it passes between the roller 12 and the clutch roller 14. It then passes under the pad 54 which is at this time in its neutral position shown in Figure 4. The film then passes under roller 16 and thence to the take-up reel to which it is secured in any suitable and well known manner. As soon as the threading has been completed, the member 104 is returned to normal position which operation may be effected either through the lever 116 or by closing switch 168. As soon as the member 104 has been restored to normal position, the portion 48 of solenoid 42 which it will be recalled, has been energized, through the entire threading operation, immediately becomes effective to move the brake pad 54 to hold the film stationary and at the same time hold the clutch roller 14 in disengaged position.

The machine is then in condition to record sound or to reproduce sound which has been previously recorded depending upon whether the recording head or the pick-up head are in operative position. If it is desired to reproduce matter already recorded, the lever 83 is moved from the position shown in Figure 4, through 180°, which operation, as previously explained, raises the recording stylus 81 from the film surface and permits the pick-up stylus 82 to engage said surface. To start the film moving, all that it is necessary to do is to press the lever 44 to the full line position shown in Figure 9. This movement of the lever 44 causes the pad 54 to be lifted to the position shown in Figure 3 and also causes the clutch roller 14 to press the film against the continuously rotating friction feed roller 12. The film immediately begins to move under feeding action of the roller 12 and as it passes out of the machine is taken up by the take-up reel.

From the foregoing it is believed that the operation of the machine has been sufficiently described but a brief recapitulation, however, may be in order. Before the machine is to be used, either for recording or for reproducing, the switch 74 to the motor 21, Figure 9, is closed. This switch remains closed during the entire time that the machine is in use, whether for recording or reproducing, and the shaft 20, fly wheel 28 and friction feed roller 12 are constantly rotated.

Pressure on the lever 44 causes the film to start but it immediately stops upon release of the lever 44.

The sound heads are controlled by the lever 83 and either may be moved to operative position or both moved to inoperative position according to the position of the lever 83.

When it is desired to reverse the movement of the film, the member 104 is rotated in a clockwise direction either by the lever 116 or by closing the switch 167. As soon as rewinding has been completed, the member 104 is restored to its normal position by moving the lever 116 in an anticlockwise direction or by closing the switch 168. In either case, the various parts controlled by the member 104 are restored to normal position either under direct control or under action of springs or gravity.

In threading the film through the machine, the member 104 is operated in the same manner as in bringing about reverse movement of the film and in addition the switch 176 controlling the reversing motor 125, is opened.

What I claim is:

1. In a sound recording mechanism, a record medium in the form of a film, a friction roller operatively related to said film for advancing the same during recording operation, a take-up reel for receiving the film as it passes from said feed roller, means associated with said reel for propelling the same, a supply reel, means associated with film, the supply reel, and the take up reel for disengaging the film from said friction roller, causing said supply reel to reverse the movement of the film and to disconnect the take-up reel from its propelling means.

2. In a sound recording and reproducing mechanism, a recording head, a pick-up head, a record film, a friction roller associated with said film for feeding it in recording direction, means associated with said film for reversing the movement of said film, a cam member, and means controlled thereby and cooperating with said heads for rendering both said heads ineffective to engage the film and to disengage the film from said feeding roller to thereby permit reverse movement of said film.

3. In a sound recording machine, a record film, a supply reel and a take-up reel therefor, means operatively associated with said reels for driving them in opposite directions, a cam member, and means controlled thereby and associated with said driving means for rendering said take-up reel driving means ineffective and for rendering said supply reel driving means effective to reversely move said film.

4. In a sound recording and reproducing mechanism, a record film, a friction feed roller operatively related to said film for feeding the same in recording direction, a brake operatively related to said film for stopping the feeding of said film by said feed roller, a weight bearing upon said film prior to its passage to said feed roller, means for reversing the movement of said film including a supply reel, a motor therefor, normally disconnected therefrom, a circuit for said motor, a cam member, and means controlled thereby to render said brake ineffective, to lift said weight off the film, to connect the supply reel motor to operate the supply reel and to close the circuit to said motor.

5. In a sound recording and reproducing mechanism, a record film, a recording head, a pick-up head, a friction feed roller operatively related to said film for feeding said record film in recording direction, a clutch roller associated with said film for causing the film to be clutched to said feed roller, a cam member, and means controlled thereby operatively associated with said heads, said clutch roller, and said feed roller to render said heads ineffective to engage the film and to render said clutch roller ineffective to cause said feed roller to feed the film.

6. In a sound recording and reproducing mechanism, a record film, a recording head, a pick-up head, a friction feed roller operatively related to said film for feeding said film in recording direction, a take-up reel for the film as it leaves the feed roller, a supply reel, a motor therefor, a cam member and means controlled thereby operatively associated with said heads, said film, said clutch roller, said feed roller, and said supply reel motor to render said heads ineffective to engage the film, to render said clutch roller ineffective to cause said feed roller to feed the film and to render said supply reel motor effective to actuate said supply reel to rewind the film.

7. In a sound recording and reproducing mechanism, a record film, a recording head, a pick-up head, a feed roller operatively associated with said film for feeding said film in a recording direction, a clutch roller for causing said film to be clutched to said feed roller whereby the same is fed, a take-up reel for the film as it leaves the feed roller, a supply reel, a motor therefor, a circuit for said motor, a cam member, and means controlled thereby operatively related to said heads, said clutch roller, and said rewind motor to render said heads and said clutch roller ineffective to engage the film, to close the circuit to said rewind motor and to engage said motor with the rewind reel.

8. In a sound recording and reproducing mechanism, a record film, a recording head, a pick-up head, means operatively associated with said film for feeding said film in recording direction relatively to said heads, a weight bearing on said film as it passes to said heads, means associated with said film for causing reverse movement of said film, and means associated with said reversing means, said weight, and said heads for rendering said reverse movement means effective and to render said weight and said heads ineffective to engage said film during reverse movement thereof.

9. In a sound recording and reproducing mechanism, a record film, a recording head, a pick-up head, means associated with said film for feeding it in recording direction relatively to said heads, means associated with said heads for moving either head into engagement with said film to record thereon or to reproduce therefrom, means for reversing the movement of said film normally ineffective, and means associated with said heads and said film reversing means for rendering both said heads ineffective to engage said film and to render effective said film reversing means.

10. In a sound recording or reproducing machine, a record film, a motor, means associated with said motor, means for rendering said motor effective or ineffective to feed said record film in one direction, while said motor is running, a second motor, normally idle, for effecting movement of said film in reverse direction, and means for rendering said first motor ineffective to feed said film and said second motor effective to move said film in reverse direction.

11. In a sound recording mechanism, a record film, a take-up reel for said film, a continuously running motor, connections from said motor to said take-up reel, a supply reel for said film, a motor associated with said supply reel for moving said film in a direction the reverse of that of the take-up reel, said motor normally ineffective to reverse the direction of movement of said film, a cam member and means in cooperative relation therewith for rendering said normally ineffective motor effective and for disconnecting said continuously running motor from said take-up reel.

WILLIAM L. WOOLF.